Nov. 15, 1955  M. A. BARTLESON  2,723,894
KITCHEN SINK CABINET
Filed Feb. 5, 1953  2 Sheets-Sheet 1
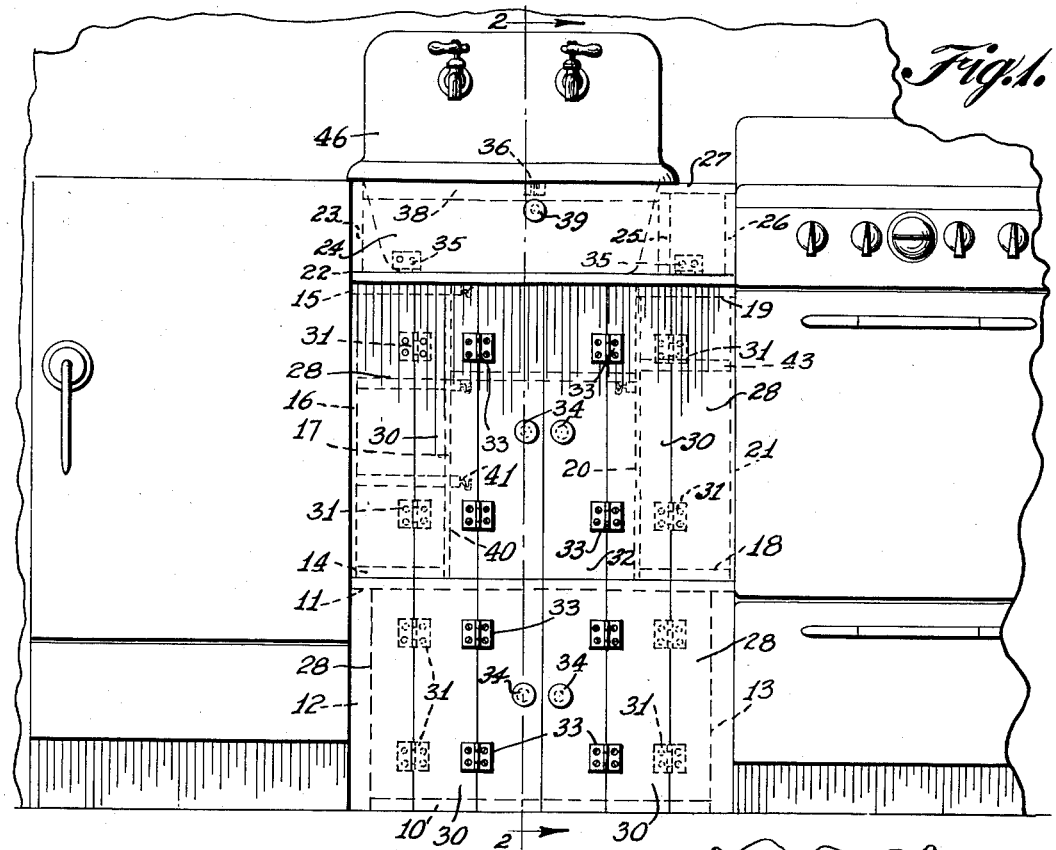
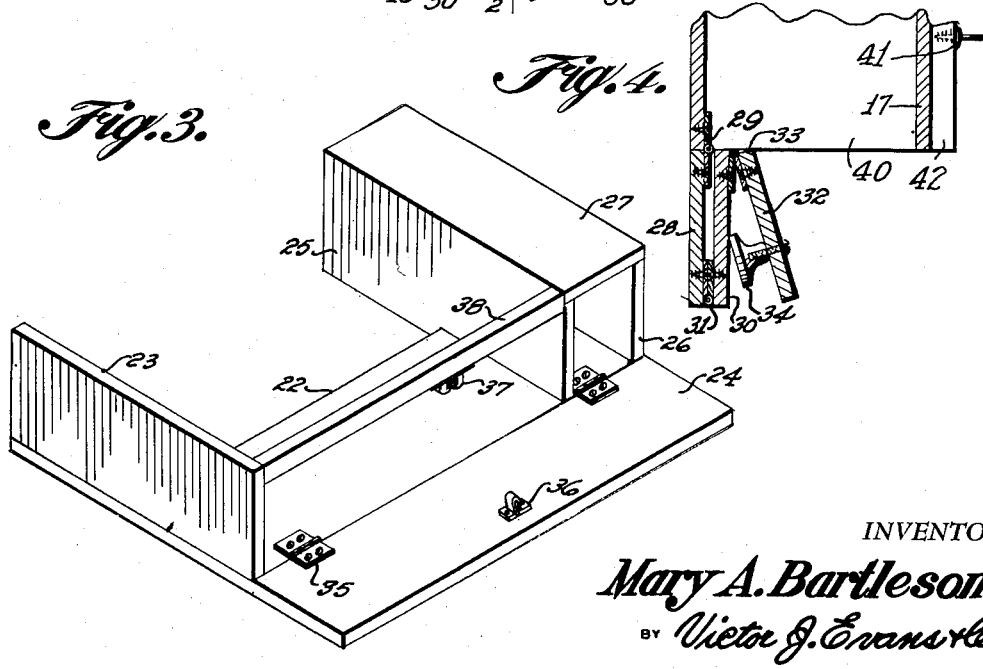
INVENTOR.
*Mary A. Bartleson.*
BY *Victor J. Evans & Co.*
ATTORNEYS Nov. 15, 1955    M. A. BARTLESON    2,723,894
KITCHEN SINK CABINET
Filed Feb. 5, 1953    2 Sheets-Sheet 2
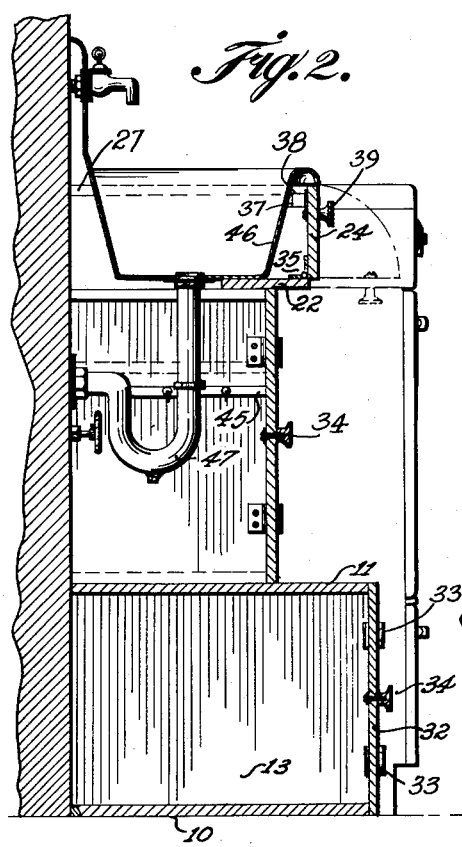
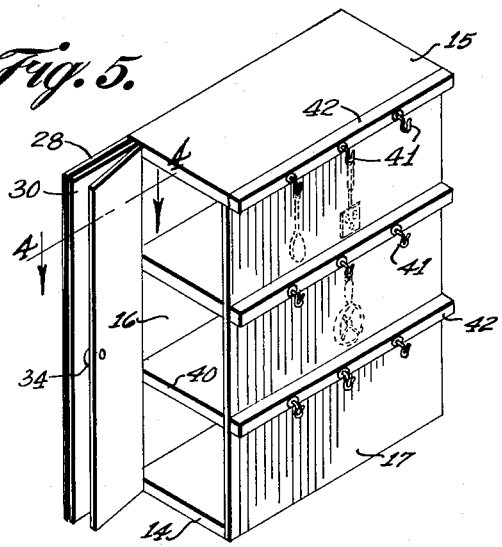
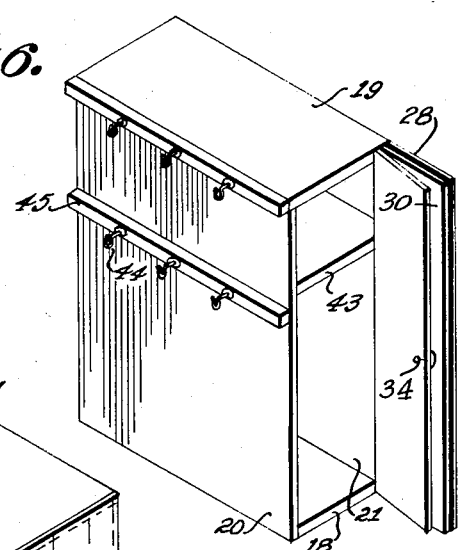
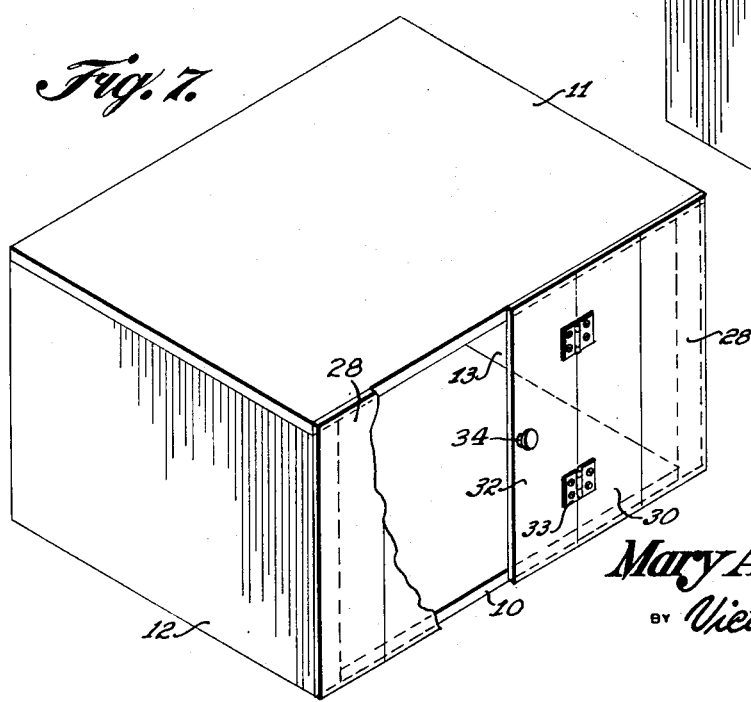
INVENTOR.
*Mary A. Bartleson*
BY *Victor J. Evans & Co.*
ATTORNEYS United States Patent Office 2,723,894
Patented Nov. 15, 1955

2,723,894

KITCHEN SINK CABINET

Mary A. Bartleson, Chicago, Ill.

Application February 5, 1953, Serial No. 335,351

2 Claims. (Cl. 312—210)

This invention relates to kitchen cabinets, and in particular cabinets which enclose the area below a kitchen sink and particularly between a refrigerator on one side of the sink and a stove on the opposite side and the cabinets, which are closed with hinged panel doors hide the objectionable area below a kitchen sink and at the same time provide storage space for kitchen utensils and other articles.

The purpose of this invention is to provide means for utilizing the area below a kitchen sink in which the area is not only made adaptable for storing utensils and other articles, but is also completely hidden so that the appearance of the kitchen is improved.

Although kitchen cabinets have been built into various areas around a kitchen it has been found difficult because of the trap and drain connections, to utilize the area below a kitchen sink and it has also been found difficult to enclose the area below the sink to improve the appearance. With this thought in mind this invention contemplates cabinets provided in a plurality of sections whereby a base section is provided for the area below the trap and drain fittings and side sections with hinged panel doors are positioned upon the base section and located below opposite edges of the sink.

The object of this invention is, therefore, to provide means for forming a plurality of cabinet sections whereby the sections are adapted to be assembled in an area below a kitchen sink to utilize the area and also to improve the appearance of the kitchen.

Another object of the invention is to provide a plurality of cabinet sections which are adapted to be assembled below a kitchen sink to form a cabinet section in which the sections may be installed without changing the sink or surrounding elements.

A further object of the invention is to provide a sectional cabinet for use in the area below a kitchen sink in which the cabinet is of a simple and economical construction.

With these and other objects and advantages in view the invention embodies a box-like base section having hinged doors at the front and adapted to be positioned in the lower part of the area below a kitchen sink, and a plurality of side sections also having hinged panels providing doors at the front and said side sections adapted to be placed upon the base section and positioned against abutting surfaces of elements at the sides of a kitchen sink.

Other features and advantages of the invention will appear from the following description taken in connection with the drawings, wherein:

Figure 1 is a front elevational view showing a portion of a side wall of a kitchen with the improved cabinet positioned below the kitchen sink and between a refrigerator and a stove at the sides of the sink.

Figure 2 is a vertical section through the portion of the side wall of the kitchen taken on line 2—2 of Fig. 1 showing sections through portions of the cabinets installed below the sink.

Figure 3 is a detail showing a section of a cabinet adapted to be positioned around the body of the sink.

Figure 4 is a detail showing a section taken on line 4—4 of Fig. 5 illustrating the construction of the folding panels forming the doors of the cabinets.

Figure 5 is a detail illustrating a section of a cabinet adapted to be positioned at one side of the sink.

Figure 6 is a detail showing a section of a cabinet somewhat similar to the cabinet shown in Fig. 5 and illustrating a modification wherein the cabinet is provided with a different arrangement of shelves and wherein the doors are positioned at the end of the cabinet opposite to the end on which the doors shown in Fig. 5 are positioned, and whereby the cabinet is adapted to be used on the side of the sink opposite to that on which the cabinet shown in Fig. 5 is positioned.

Figure 7 is a detail illustrating the base section of the cabinet.

Referring now to the drawings wherein like reference characters denote corresponding parts the improved kitchen sink cabinet of this invention includes a box-like base section having a bottom 10, a top 11 and end walls 12 and 13, a side section having a bottom 14, a top 15 and side walls 16 and 17, a similar side section having a bottom 18 a top 19 and side walls 20 and 21, an upper section having a base 22, an end panel 23, a door 24 and a tubular section having side walls 25 and 26 and a cover 27, and suitable folding or hinged panels providing doors on the base and side sections.

The doors of the base and side sections are provided with mounting panels 28 that are secured to the side walls of the section with hinges 29, intermediate panels 30 that are secured to the mounting panels with hinges 31 and end panels 32 that are secured to the intermediate panel with hinges 33 whereby the panels are adapted to fold to the position shown in Fig. 4, or to open to the position shown in Fig. 1 wherein the hinges 29 and 31 are hidden behind the panels and the hinges 32 are positioned on the outer surfaces of the panels. The end panels 32 are provided with knobs 34 with which the panels may be opened and closed.

It will be noted that the panels forming the doors of the side sections are of the same size as the panels forming the doors of the base section whereby the panels open to provide complete closures for upper and lower areas of the sink cabinet and with the lines between the panels of the side sections in registering relation with the lines between the panels of the base section.

The upper section of the cabinet, which extends around the sink and in which the lower part of the sink is nested not only hides the sink in the closed position but also provides a closure for the end section formed with the walls 25 and 26 and cover 27.

The door 24 is secured to the base 22 of the upper section with hinges 35 and the door is retained in the closed position with a latch 36 which is positioned to coact with a socket 37 on a bar 38 extended across the upper part of the upper section. The door 24 is also provided with a knob 39, similar to the knob 34.

The side cabinet, shown in Fig. 5, is provided with shelves 40 and hooks 41 are provided on bars 42 which extend across the outer surface of the side section.

The side section shown in Fig. 6 is also provided with a shelf, as indicated by the numeral 43 and hooks 44 are carried by bars 45 on the outer surface of one side of the section.

With the parts constructed and assembled in this manner the complete cabinet is provided for enclosing the area below a kitchen sink, such as the sink 46 and the trap 47 of the sink is positioned in the area between the side cabinets.

The shelves of the side cabinets or base section may be positioned at different points and as many of the shelves as may be desired may be used.

The sections may be provided as independent units or they may be assembled and secured together so that they may be installed as a unit.

The inner ends of the base and side sections of the cabinet are open, being closed by the surface of the wall at the back of the sink.

It will be understood that modifications, within the scope of the appended claims, may be made in the design and arrangement of the parts without departing from the spirit of the invention.

What is claimed is:

1. In a kitchen sink cabinet, the combination which comprises a box-like lower section having top, bottom and side walls with folding doors hinged to the edges of the side walls and extended inwardly to the center thereof, side sections having side walls extended upwardly from the top of the base section and having folding doors extended from the edges of the side walls and also extended to the center of said base section with the front edges of the side walls of the side sections inset with relation to the front edges of the top, bottom and side walls of the base section, and an upper section having a tubular section at one side and having a bottom and a door hinged at the front edge of the bottom of the upper section and adapted to open to an outwardly extended position mounted on the upper ends of the side sections, said upper section having a cavity for receiving a kitchen sink and the front edge of the bottom of the upper section being outset with relation to the front edges of the side walls of the side section but inset with relation to the front edges of the top and bottom of the base section.

2. A kitchen sink cabinet comprising a box-like base section having a top, bottom and side walls, with the bottom adapted to be positioned on a floor below a kitchen sink, side sections having side walls, shelves therein connected to the side walls, said side walls extended upwardly from said base section with the front edges of the side walls of the side sections inset with relation to the front edges of the top and bottom of the base section, and folding panels providing doors on the side and base sections, said folding panels of both side and base sections extending from the edges of the side walls of the side and base sections to meeting points at the center providing closures for the area below a kitchen sink, and an upper section having a base mounted on the side section and having a door hinged to the front edge of the base and adapted to swing outwardly to a horizontal position, said upper section having a cavity therein in which the kitchen sink is nested with the front edge of the base of the upper section being outset with relation to the front edges of the walls of the side sections but inset with relation to the front edges of the top and bottom of the base section.

References Cited in the file of this patent

UNITED STATES PATENTS

| | | |
|---|---|---|
| 189,942 | Kirkwood | Apr. 24, 1877 |
| 355,533 | Irwin | Jan. 4, 1887 |
| 469,842 | Thompson | Mar. 1, 1892 |

FOREIGN PATENTS

| | | |
|---|---|---|
| 412,036 | Great Britain | June 21, 1934 |

OTHER REFERENCES

Popular Mechanics Magazine, March 1950, page 187.